Figure 1:
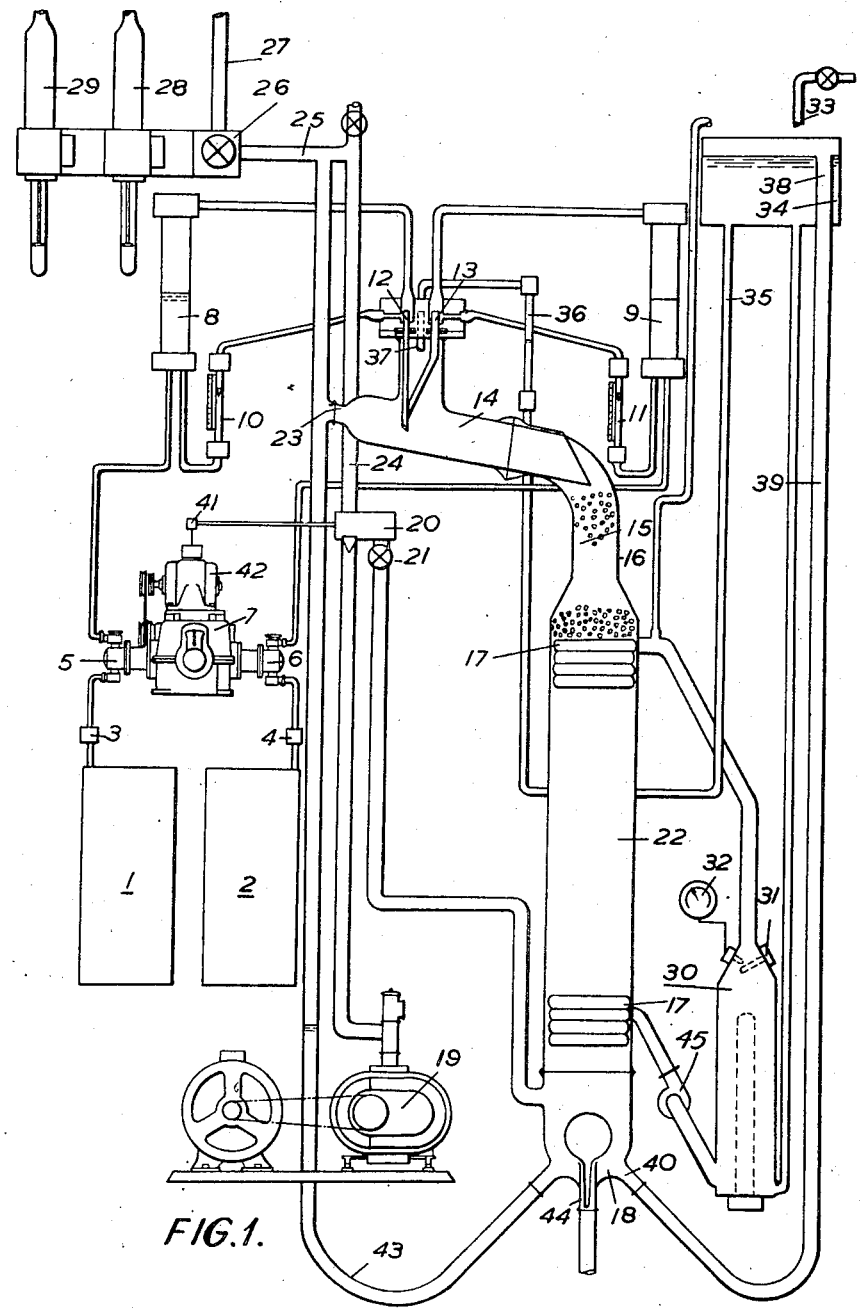

Oct. 6, 1953

C. H. EVANS 2,654,656

PRODUCTION OF CHLORINE DIOXIDE

Filed May 11, 1950

2 Sheets-Sheet 1

Inventor
CYRIL HARRY EVANS
By
John James Victor Armstrong
Attorney

Oct. 6, 1953    C. H. EVANS    2,654,656
PRODUCTION OF CHLORINE DIOXIDE
Filed May 11, 1950    2 Sheets-Sheet 2

Inventor
CYRIL HARRY EVANS
By
John James Victor Armstrong
Attorney

Patented Oct. 6, 1953

2,654,656

UNITED STATES PATENT OFFICE 2,654,656

PRODUCTION OF CHLORINE DIOXIDE

Cyril Harry Evans, Cambridge, England, assignor to Addage Limited, London, England, a British company Application May 11, 1950, Serial No. 161,380
In Great Britain May 24, 1949

5 Claims. (Cl. 23—267)

This invention relates to the production of chlorine dioxide by reaction between chlorate and a suitable acid.

As pointed out in my prior United States Patent No. 2,344,346 granted March 14, 1944, hydrochloric acid is a suitable acid for this purpose and this may be used with or without sulphuric acid. The chlorate first reacts with the hydrochloric acid to produce chloric acid and then the chloric acid is reduced by the hydrochloric acid to yield chlorine dioxide according to the following equation, namely:

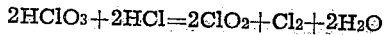

$$2HClO_3 + 2HCl = 2ClO_2 + Cl_2 + 2H_2O$$

A chloride may be used in solution with the chlorate in order to generate the hydrochloric acid in situ and in that case a suitable acid for use is sulphuric acid alone.

This reaction is fully described in my prior British Patent No. 546,282 published July 6, 1942, and it is there pointed out that sodium chlorate is the preferred chlorate to employ and that the concentration of the solution is preferably between 20% and 50% by weight. It is there also pointed out that when using a solution containing chlorate and chloride in conjunction with sulphuric acid which is preferred, the concentration of the sulphuric acid is preferably about 70%.

In the production of chlorine dioxide by this reaction chlorine is also produced as can be seen from the equation. One object of the invention is to secure a ratio of chlorine dioxide to chlorine which is as high as possible consistent with a high yield of chlorine dioxide. By the reaction of sulphuric acid upon a mixture of sodium chlorate and sodium chloride it is possible to obtain chlorine dioxide to chlorine ratios approaching 2:1 by volume.

Another object of the invention is to provide a continuous process for producing chlorine dioxide which can be operated with a high degree of safety. A further object is to obtain a high yield of chlorine dioxide based on the raw materials used. These and other objects will be apparent from the following description of the invention.

I have observed that the reaction between sulphuric acid of fairly high concentration, e. g., not less than about 70% and an aqueous solution of chlorate and chlorite takes place in three fairly well defined steps and I have found it advantageous to carry out these steps, or at least the first two of them, in physically separate stages involving the use of at least two interconnected reaction vessels or zones through which the stream of reacting ingredients flows continuously.

The three steps are:

(a) An initial exothermic reaction which is quite rapid, (b) A subsequent endothermic reaction which is much slower, and (c) A final stripping of gaseous products from the reacted materials.

When solutions of sulphuric acid and of sodium chlorate and chloride are mixed there is an immediate temperature rise which is caused by the hydration of the sulphuric acid. As there is a danger of chlorine dioxide decomposing at a high temperature it is necessary for the strength of the acid and of the chlorate chloride solution to be controlled. In the first few seconds the reaction is very vigorous and the mixed liquids effervesce, about 40% of the theoretical amount of gas being produced in less than 30 seconds and over 60% in 60 seconds.

Although the actual reaction between sulphuric acid and sodium chlorate and chloride is endothermic, more heat is liberated by the dilution of sulphuric acid of not less than about 70% strength when the solution of chlorate and chloride is mixed therewith than is necessary for this initial production of gas and accordingly the first stage of the reaction is effectively exothermic and does not therefore require the application of heat from an external source. The reaction in this first stage is, however, so vigorous and rapid that we have found it necessary, in this stage, to mix the liquids thoroughly in the correct proportions and to carry away the gaseous products of reaction by means of a rapid stream of air or other inert gas, the quantity of such gases being such that the partial pressure of the chlorine dioxide is kept low, preferably below about 12 mm. of mercury.

As the heat evolved in the dilution of the sulphuric acid is not sufficient to carry the reaction to completion it is necessary to apply heat from an external source during the second stage of the reaction. An "external source" means a source of heat external to the reaction itself. To allow sufficient time for the second stage of the reaction to be completed by the supply of heat from an external source, the mixed liquids must be caused to travel over an elongated path. During such travel the gaseous products of the reaction must be removed by a current of air or inert gas. However, the second stage of the reaction involves a time of only a few minutes, say up to six minutes or more, when reasonable efficiencies are required. Slightly higher efficiencies may be obtained by extending this period, but this is not desirable if the size of the apparatus is to be kept small.

The third stage of the reaction, which simply consists of stripping the gases from the exhausted reaction mixture coming from the second stage, may not, in practice, be necessary as a reasonable efficiency can be secured by omitting the stripping step.

In the first and second stages it is desirable to comply with the conditions specified in my prior United States Patent No. 2,344,346 granted March 14, 1944, of ensuring that the reaction mixture at any position in the stream is prevented from contact and admixture with the reaction mixture at any other position in the stream at which the reaction is at a different stage and that the gaseous products are removed from contact with all parts of the reaction mixture as they are liberated.

The method of the present invention for preparing chlorine dioxide from chlorate and a suitable acid or acids is carried out by continuously delivering separate streams of aqueous solutions of the chlorate and the acid to a primary reaction chamber or zone and allowing them to mix therein, continuously removing the gaseous products of reaction from such primary reaction chamber or zone, causing the mixed liquids to flow continuously through the primary reaction chamber or zone and pass therefrom, after a period of time sufficient to allow substantially the whole of the heat evolution to take place, e. g. about half a minute, into a secondary reaction chamber or zone, heating the mixed liquids in the secondary reaction chamber or zone to produce further chlorine dioxide and continuously removing the gaseous products of reaction from such secondary reaction chamber or zone.

Preferably, the gaseous products of reaction are removed from the primary and secondary reaction chambers or zones by causing a stream of air or inert gas which is or becomes substantially saturated with water vapour to pass over the mixed liquids therein and sweep away the gaseous products of reaction as they are formed.

Most suitably the stream of air or inert gas from the secondary reaction chamber or zone carrying the gaseous products of reaction therein is employed as the stream of air or inert gas for passing through the primary reaction chamber or zone.

The first stage of the reaction can conveniently be carried out by allowing the mixed liquids to flow over the bottom of a primary reaction chamber so as to permit the stream of air or inert gas carrying gaseous products of reaction to pass over the liquids without substantially mixing therewith. Accordingly the streams of air or inert gas may be caused to flow through the reaction chambers or zones counter-current to the mixed liquids without mingling therewith.

The method of the present invention may also be utilised for the production of a solution in water of the chloride dioxide instead of a gaseous product in a mixture of air or inert gas. With this object in view the gaseous products of reaction may be conveniently sucked from the reaction chambers or zones by a water injector thereby producing in the throat of the injector a solution in water of the chlorine dioxide.

It is convenient to cause the mixed liquids passing from the primary reaction chamber or zone into the secondary reaction chamber or zone to divide into a plurality of flowing streams.

As the second stage of the reaction requiring heat to be supplied for the mixed liquids takes place in a secondary reaction chamber or chambers, this is preferably so arranged that the mixed liquids are caused to flow therethrough within a period of time of between 4 and 6 minutes from the initial mixing.

In the secondary reaction chamber or chambers the mixed liquids may be caused to flow down the surfaces of helical bodies of glass or other inert solid material and these helical bodies may be hollow permitting a heating fluid such as warm water to be passed therethrough. This heating fluid may be at a temperature of 120 to 160° F.

The purpose of employing a plurality of helical surfaces in the secondary reaction chamber or chambers is to constrain the mixed liquids to follow a definite path thereby avoiding mixing of these liquids at any stage to any substantial extent with the mixed liquids at any other stage of the reaction.

As indicated above, the quantity of air or other inert gas employed in the first stage of the reaction should be sufficient to reduce the partial pressure of chlorine dioxide to not more than about 12 mm. of mercury. It is necessary in the primary and secondary reaction chambers or zones to employ sufficient air to keep the partial pressure of chlorine dioxide at a safe figure but not to use so much as will cause excessive evaporation. A high velocity of air over the liquid surfaces is required to remove gas and to prevent the occurrence of stagnant areas where high concentrations of gas may occur.

The apparatus for preparing chlorine dioxide according to the present invention has a primary reaction chamber consisting of a vessel whose bottom is slightly inclined to the horizontal, inlet pipes for feeding on to such inclined bottom contiguous streams respectively of aqueous solution of chlorate and aqueous solution of mineral acid, an outlet at the upper end of the vessel for withdrawal of gases, an outlet at the lower end of the vessel from which the mixed liquids can flow, a secondary reaction chamber consisting of a vertical tower substantially filled with helices of glass or other inert solid down the surface of which the mixed liquids can flow in an elongated path, a connecting passage between the outlet of the primary reaction chamber and the top of the secondary reaction chamber which is packed to cause the mixed liquids flowing from the outlet of the primary reaction chamber to be divided into a plurality of streams when entering the secondary reaction chamber, an inlet for air or other inert gas at the lower end of the secondary reaction chamber and an outlet for spent reaction liquid at the bottom of the secondary reaction chamber.

There is preferably provided a float valve in the outlet for spent reaction liquid so that such outlet is always sealed by liquid when open preventing escape of the gaseous products of reaction. There may be provided an inlet for water adjacent to the outlet for spent reaction liquid to dilute the spent reaction liquid and assist in opening the float valve.

As there is a danger of explosion if the concentration of chlorine dioxide rises too high, means should be provided to ensure that the reaction is stopped if the gaseous products of reaction are not swept away either through failure of the air supply or breakage of the apparatus. For reason of safety, therefore, a water inlet is preferably provided on the primary reaction chamber connected through a U-tube extending below the primary reaction chamber to a water tank at a higher level than the primary reaction chamber whereby the primary and the secondary reaction chambers may be flooded with water unless a predetermined slight super-atmospheric pressure is maintained therein.

The air for sweeping away the gaseous products of reaction may be supplied by a pump which delivers the air to the inlet at the lower end of the secondary reaction chamber, a non-return valve being fitted in the air line between the pump and such inlet.

Feed receptacles for the aqueous solutions of chlorate and acid are preferably arranged above the primary reaction vessel and pumps are provided for delivering such solutions from storage vessels to the feed receptacles, the connection from the bottom of the feed receptacles to the inlet pipes of the primary reaction vessel including overflow devices to prevent siphoning of liquid, gas connections also being provided between the inlet pipes and the tops of the feed receptacles to maintain the same pressure in the feed receptacles as in the primary reaction chamber.

Figure 2:
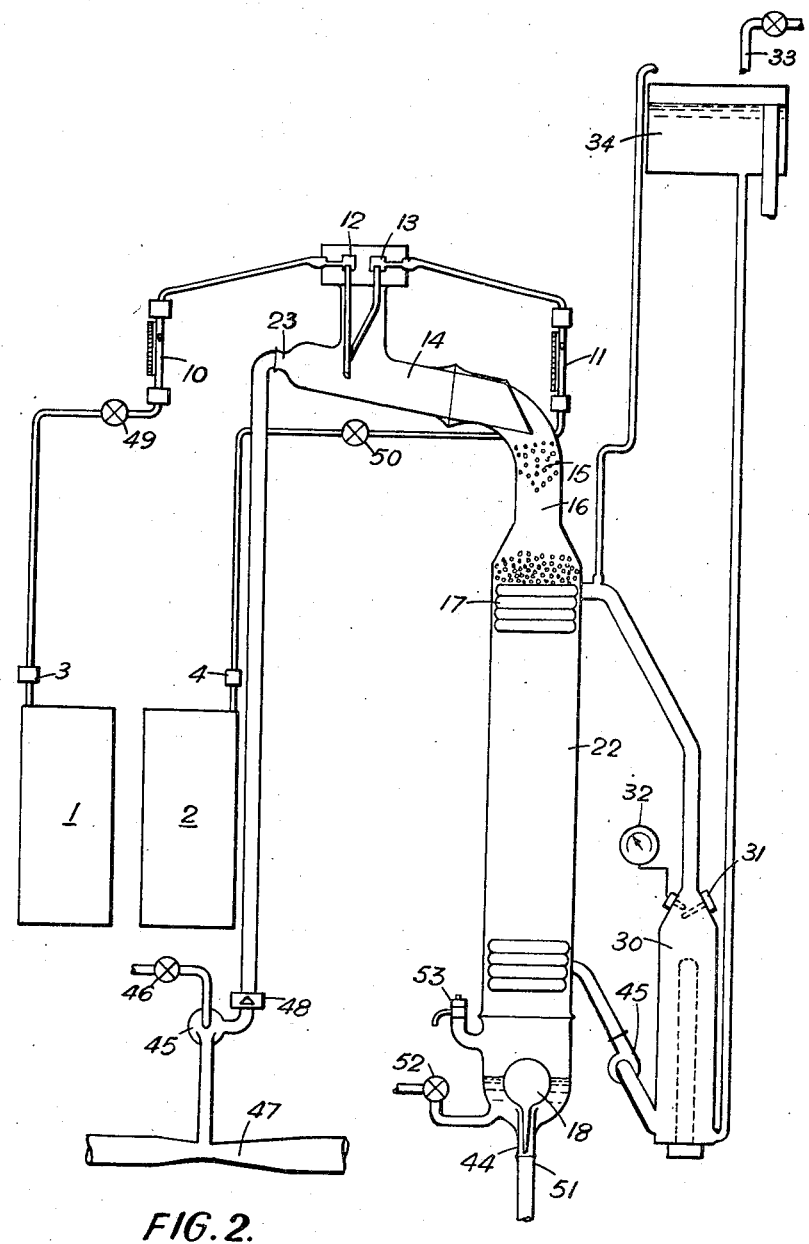

A preferred form of apparatus is shown diagrammatically in the accompanying drawings, Figure 1 of which shows an arrangement for producing gaseous chlorine dioxide and Figure 2 of which shows an arrangement for producing an aqueous solution of chlorine dioxide.

In these drawings, 1 and 2 are the respective tanks for chlorate and chloride solution and sulphuric acid. 3 and 4 are filters. In Figure 1 pumps 5 and 6 are shown having variable stroke mechanism 7 to draw the solutions through the filters and force them into the pulse tubes 8 and 9 which are provided to damp out the pulsations in flow from the pumps. Outlet pipes from the pulse tubes 8 and 9 are connected through rotameters 10 and 11 with overflow devices 12 and 13 fitted into the top of the primary reaction chamber 14.

As will be seen from the drawings, the bottom of the primary reaction vessel is slightly inclined to the horizontal and the liquid inlet tubes connected to the overflow devices 12 and 13 converge to bring their open ends close together so that the streams flowing therefrom intermingle and the liquid accordingly undergo at least some mixing on the inclined bottom of the primary reaction vessel 14.

The lower end of the reaction vessel 14 is connected to the narrow section pipe 16 provided with a solid packing 15 which may consist of glass balls and is provided to divide the flow of mixed liquids into a plurality of streams. Connected to the lower end of the narrow section pipe 16 is a vertical tower 22 containing glass coils 17 (shown, for convenience, only at the top and bottom of tower 22) through which may be passed warm water from the electric heater 30 provided with a thermostat 31 and thermometer 32 by means of centrifugal pump 45. A water tank 34 is provided, fed from a pipe 33, which maintains the heater 30 and coils 17 filled with water.

A float valve 18 is provided in an outlet 44 at the bottom of the tower 22.

As shown in Figure 1, air from a blower 19 passes through a non-return valve into a distributor 20 from which it passes through valve 21 into the bottom of the tower 22. The air which passes up the tower 22 passes also through the primary reaction vessel 14 and escapes from the upper end of the vessel 14 into pipe 23. A quantity of air from the distributor 20 passes through the pipe 24 and mixes with the air carrying the gaseous products of reaction at 25. The gas/air mixture then passes to the control valve 26 which serves either to divert it to waste pipe via the pipe 27 or to the flow meters 28 and 29 from which it is delivered to a point where it is to be utilised, e. g., a flour agitator.

To ensure the safety of the apparatus shown in Figure 1, there is provided a U-pipe 35 having a sight glass 36 through which water can flow from tank 34 into the water inlet 37 of the primary reaction vessel 14. Normally, however, the blower 19 provides air at sufficient pressure to hold the liquid back in the sight glass 36 where the pressure can be measured by the head of liquid shown. When the level of water in the tank 34 reaches the overflow 38 water passes down the pipe 39 and enters the bottom of the tower 22 by the inlet 40.

As the gas/air mixture leaving at the point 23 is rather above atmospheric temperature condensation of moisture may occur and pipe 43 is provided to enable this moisture to be collected and removed with the spent liquors.

It will be seen that by the provision of the U-tube 35 water from the tank 34 will flood the primary reaction vessel 14 and the secondary reaction vessel constituted by the tower 22 if the air pressure fails. A switch 41 sensitive to the pressure in distributor 20 may be provided to stop the pump motor 42 in the event of the air pressure failing while the motor is still running.

The tank 1 preferably contains an aqueous solution of 28% sodium chlorate and 17% sodium chloride and the tank 2 preferably contains sulphuric acid of about 77% strength.

To start the process for producing gaseous chlorine dioxide the blower 19 is put in action until the apparatus has been freed of water and the water level is shown in the gauge glass 36. The motor 42 is then started up to deliver the solutions via the filters 3 and 4 and pulse tubes 8 and 9 to the primary reaction chamber 14. The air velocity is sufficiently high over the surface of the reacting liquids in the primary vessel 14 to sweep away immediately the gas which is formed, the height and cross section of the vessel 14, however, being sufficiently large to prevent the spray from the effervescence reaching the sides of the vessel or being carried away as such by the air. The air at this point is saturated with water vapour so that the spray which reaches the walls of the vessel immediately adjacent to the mixed liquids will not dry up. While the mixed liquids are in the primary reaction vessel 14 they are reacting vigorously and as they leave the vessel 14 and drop on to the packing 15 they are still reacting but not so vigorously. The mixed liquids are in the primary reaction vessel 14 and packing 15 for quite a short time, say half a minute to one and a half minutes. The packing 15 is a solid such as glass beads which does not hold the liquid by capillary attraction nor spread it out into a film but merely breaks the stream up into a large number of small streams. These streams fall on to the top of the coils 17 in the tower 22. At this stage the vigorous evolution of gas has been completed and the temperature has fallen. Heat is therefore supplied through the coils 17 by means of water flowing therethrough at a temperature of from 120 to 150° F. The time the mixed liquids take to pass down the tower 22 is that which is sufficient to complete the reaction to the desired degree of efficiency; as a rule about 4 to 5½ minutes is satisfactory. In the tower 22 the upflowing air stream removes the gas as it is produced and the amount of air used is preferably such that it neither dries up the liquids by excessive evaporation nor dilutes them by excessive condensation of water vapour.

In order to prevent intermixing of the liquids at different stages of the reaction, the tower 22 is filled as completely as possible by the coils 17 which are of substantially the same length and the same fall. This is achieved by using multiple coils of different pitch. Thus, in the outer coils there may be three coils of large pitch wound into each other so as to appear as a single close pitched coil. The next coil consists of two such coils wound into one another and the innermost coil is single. All the coils join to a common glass ring or manifold at the top and bottom through which the hot water is supplied to them. In order that the liquid spread by the packing wets all the coils equally the top of each coil is exposed. In the case of the three outer coils the top of each coil occupies 120° of the top surface and in the case of the middle coil 180° of the top surface whilst the whole of the top of the centre coil is exposed. To take the weight of the packing 15 off the coils 17 and to prevent liquid or air traversing the open centre of the inner coil a glass plate (not shown) having perforations is placed over the coil 17 on which the packing rests.

As the coils 17 occupy the greater part of the tower 22 the free space is very small and the air passes up at a high velocity which is sufficient to prevent any stagnant areas of high gas concentration forming.

When even higher efficiency is required, steps may be taken to maintain the flow of the numerous individual streams formed in the packing 15 and to increase the holding capacity of the coils for liquid. For this purpose the coils 17 may be covered with glass helices which may be termed "glass springs." These are a loose fit on the coils but the adjacent convolutions of the helices are spaced together as closely as possible so that a continuous liquid volume is obtained which flows along the helices even at a very small angle owing to the surface tension effect.

When it is desired to make a solution of chlorine dioxide in water, e. g., when the gas is to be used for the treatment of water, air must be excluded as far as possible in view of the difficulty of dissolving gas at low partial pressure. In this case, therefore, the air circulating system is dispensed with and a water injector is fitted in the outlet 23. The resulting reduction of pressure keeps the partial pressure of the chlorine dioxide down to a safe figure; there is also dilution with water vapour. The gaseous reaction products are immediately dissolved in the throat of the injector and can thus be introduced into the outlet pipe without dilution with air. A form of the apparatus suitably modified for this purpose is shown in Figure 2.

In Figure 2, the outlet tube 23 of the primary reaction vessel 14 is connected to the suction side of a water injector 45. A source of water under pressure is delivered via the valve 46 and introduced into the water main or a branch of the water main at low pressure, or at a point of low pressure such as a venturi 47. The injector not only serves as a means of producing the reduced pressure in the apparatus, and thereby removing the gases produced, but also serves as an excellent dissolving device for the gases. When used for this purpose a very considerable simplification of the apparatus is possible, and whilst the electrically driven motor pumps 5 and 6 may be retained, these are not essential and are therefore omitted from Figure 2. The solutions in the tanks 1 and 2 are forced to rise by atmospheric pressure via the filters 3 and 4 and the control valves 49 and 50 via the rotameters 10 and 11 to the inlet overflow weirs 12 and 13 by reason of the reduced pressure in the apparatus. This obviates the need for the pumping mechanism. The flooding arrangement shown in Figure 1 is no longer required since, if the water supply to the injector fails, water from the main 47 will be drawn back into the apparatus by reason of the reduced pressure. As this may occur with some violence the valve 48 is arranged so as to reduce the stream of water to a small flow and a further valve 53 is added so as to relieve any excess of water pressure in the apparatus. Because of the reduced pressure the waste liquids would not normally leave the outlet 51 so that arrangements must be made so that the liquids may leave at the point 51 without the introduction of air. This arrangement may take the simple form of a barometric leg where adequate height is available, or otherwise a water injector of the type 45 may be applied to the point 51 so as to extract the waste liquids. It is desirable that diluting water should be added via the valve 52 so as not only to dilute the waste liquids, but also to provide a constant stream through the outlet injector or barometric leg. It is not necessary either to retain the pressure operated device 41 shown in Figure 1 to stop the flow of liquids in the event of the stoppage of the apparatus since with the arrangement shown in Figure 2 the supply of liquids will fail with the stoppage of the injector. If pumps such as 5 and 6 are employed with the arrangement shown in Figure 2, then a device similar to 41 but actuated by sub-normal pressures may be used.

I claim:

1. Apparatus for preparing chlorine dioxide which comprises a primary tubular chamber having its longitudinal axis slightly inclined to the horizontal, separate inlet pipes for admission of liquid reactants extending from above into the upper portion of said inclined primary chamber at a substantial distance from the upper end thereof, an outlet for gas at the upper end of the primary chamber, a secondary substantially vertical tubular chamber, connected at its upper end to the lower end of the primary chamber, said secondary chamber having an upper portion thereof of substantially less diameter than the lower portion thereof, at least one helically arranged conduit in said lower portion adapted for the circulation of heating fluid and helically extending through a substantial extent of said lower portion of said secondary chamber and so arranged therein as to be adapted to support a bed of inert packing material in the upper portion of said secondary chamber, and an inlet for inert gas and an outlet for reaction liquor at the lower end of said lower portion of said secondary chamber.

2. Apparatus as claimed in claim 1, which also includes a water injector connected to the outlet at the upper side of said primary tubular chamber and a water injector connected to the outlet for spent liquid at the bottom of said lower portion of said secondary tubular chamber.

3. Apparatus as claimed in claim 1 having a water inlet to said primary tubular chamber connected through a U-tube extending below said primary tubular chamber to a water tank at a higher level than said primary tubular chamber whereby said primary and secondary tubular chambers may be flooded with water unless a predetermined slight superatmospheric pressure is maintained therein.

4. Apparatus as claimed in claim 1 which includes a pump for delivering air to the inlet at the lower end of said secondary tubular chamber through an air line and a non-return valve in said air line between said pump and said inlet.

5. Apparatus as claimed in claim 1 which includes liquid feed receptacles arranged above said primary tubular chamber, U-tube connections from the bottoms of said feed receptacles to the inlet pipes in the upper side of said primary tubular chamber, overflow devices in said U-tube connections and gas connections from the said liquid inlet pipes to the tops of said liquid feed receptacles.

CYRIL HARRY EVANS.

References Cited in the file of this patent

UNITED STATES PATENTS

| Number | Name | Date |
|---|---|---|
| 756,271 | Haef | Apr. 5, 1904 |
| 1,474,062 | Bollmann | Nov. 13, 1923 |
| 1,541,175 | Ostromislensky et al. | June 9, 1925 |
| 1,984,665 | Tone | Dec. 18, 1934 |
| 2,131,447 | Logan | Sept. 27, 1938 |
| 2,344,346 | Evans | Mar. 14, 1944 |
| 2,373,830 | Holst | Apr. 17, 1945 |
| 2,390,432 | Evans | Dec. 4, 1945 |
| 2,481,240 | Rapson et al. | Sept. 6, 1949 |

OTHER REFERENCES

McPherson and Henderson's "General Chemistry," page 593, 3rd ed., Ginn and Co., N. Y.